United States Patent [19]
Ozog

[11] Patent Number: 5,282,560
[45] Date of Patent: Feb. 1, 1994

[54] LUGGAGE RACK WITH WIND NOISE REDUCER

[75] Inventor: Robert J. Ozog, Farmington Hills, Mich.

[73] Assignee: Ford Motor Company, Dearborn, Mich.

[21] Appl. No.: 52,937

[22] Filed: Apr. 26, 1993

[51] Int. Cl.$^5$ .............................................. B62D 25/00
[52] U.S. Cl. .................. 224/316; 296/180.1; 244/130; 224/309
[58] Field of Search ............... 224/316, 309, 321, 325, 224/326; 296/180.1; 244/130

[56] References Cited

U.S. PATENT DOCUMENTS

| | | |
|---|---|---|
| 2,685,470 | 8/1954 | Werner . |
| 3,108,766 | 10/1963 | Beckman . |
| 3,296,357 | 1/1967 | Greber . |
| 3,529,862 | 9/1970 | Jousserandot . |
| 3,853,254 | 12/1974 | Helm . |
| 4,175,682 | 11/1979 | Bott . |
| 4,334,658 | 6/1982 | Mackenzie . |
| 4,501,385 | 2/1985 | Bott .................... 224/319 |
| 4,742,944 | 5/1988 | Iida et al. ............... 224/316 |
| 4,776,535 | 10/1988 | Paterson et al. ............ 244/130 |
| 4,998,687 | 3/1991 | Gorman . |
| 5,050,822 | 9/1991 | Whitehouse et al. . |
| 5,069,403 | 12/1991 | Marentic et al. . |

FOREIGN PATENT DOCUMENTS

| | | |
|---|---|---|
| 2614365 | 10/1976 | Fed. Rep. of Germany ...... 224/316 |
| 2612954 | 9/1977 | Fed. Rep. of Germany . |
| 3017358 | 12/1981 | Fed. Rep. of Germany . |
| 209636 | 12/1983 | Japan . |

*Primary Examiner*—Ernest G. Cusick
*Attorney, Agent, or Firm*—Daniel M. Stock; Roger L. May

[57] ABSTRACT

A luggage rack (14) of the type suitable for installation on the roof (12) of an automotive vehicle (10) is improved through the addition of a mechanism for reducing the noise generated by wind passing over cross members (16,18) of the luggage rack (14). The mechanism is a strip (34) having irregular outer surfaces (40,42) secured to outer surfaces of at least one of the cross members (16,18). The irregular surfaces (40,42) operate to vary the cross section of the cross member (16,18) as it extends transversely of the vehicle (10), and the strip (34) may be formed as a tape having an adhesive layer (36) for securement to the luggage rack (14).

16 Claims, 1 Drawing Sheet

LUGGAGE RACK WITH WIND NOISE REDUCER

BACKGROUND OF THE INVENTION

The present invention relates generally to automobile luggage racks and more specifically to structure reducing wind noise propagated by movement of vehicles carrying such luggage racks.

While the mounting of luggage racks on the roofs or deck lids of automotive vehicles has been found to be useful in expanding the load carrying capability of the vehicle, such devices particularly those mounted on roofs have the adverse effect of presenting a surface set off from the originally designed surface of the vehicle which is not consistent with the desired air dynamic approach of the vehicle design. The luggage racks generally include one or more transversely extending cross members which tend to disturb the flow of air over the roof of the vehicle and create perceptible noises within the vehicle, such as high pitch whistles or buzzes. This is particularly pronounced when the frequency of the wind load imposed on the cross member matches the natural frequency of the cross member.

DESCRIPTION OF THE RELATED ART

Responsive to this condition, automotive designers have attempted to modify the structure of the luggage racks by modifying the configuration of the cross member to reduce the noise effect. German Patent 2614365 discloses a design in which a mesh sleeve is put in surrounding relationship with respect to circular and rectangular cross section cross members. This approach has been found to not be aesthetically pleasing and requires a significant outlay in material and labor to fabricate and install the sleeve.

Another approach taken to enhance noise reduction in roof mounted luggage racks is shown in U.S. Pat. No. 4,175,682 to Bott. Bott teaches the use of an angularly adjustable tear drop cross section for the cross member to optimize the angle by which the cross member is presented to the air stream to minimize the noise effect. Disadvantageously this approach requires a significant complication in the design of the supports for the cross members and adds both direct assembly labor and developmental labor in performing and setting the desired adjustment.

SUMMARY OF THE INVENTION

Responsive to the disadvantages of the prior art, the present invention provides a luggage rack with at least one transversely extending cross member, and means for supporting the cross member that includes structure for defining the cross sectional shape of the cross member in a fashion that varies along the transfer extent of the cross member.

According to a feature of the present invention, that structure for defining the shape of the cross member is an irregularly shaped elongated strip secured to the cross member.

It has been found that irregularly disturbing the flow of air over the cross member reduces wind noise by reducing the mutual amplification of laterally adjacent portions of the air flow.

It is an object of the present invention to provide a luggage rack having means for reducing wind noise over its cross member that is simple to produce and assemble.

It is another object of the present invention to provide a luggage rack having means for reducing wind noise over its transverse cross member which does not require significant development unique to a particular automobile.

BRIEF DESCRIPTION OF THE DRAWINGS

These and other objects and advantages will be apparent to those skilled in the automotive aerodynamics arts upon reading the following description with reference to the accompanying drawing in which.

DESCRIPTION OF THE PREFERRED EMBODIMENT

Figure 1:
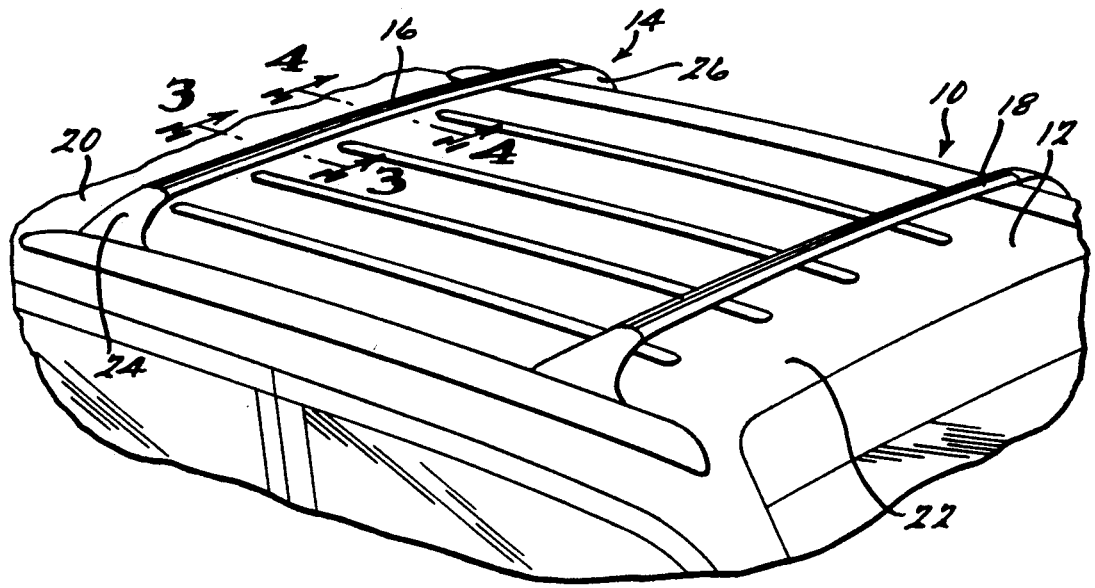
FIG. 1 is a perspective view of the roof of the automobile on which is mounted a luggage rack according to the present invention.
Figure 2:
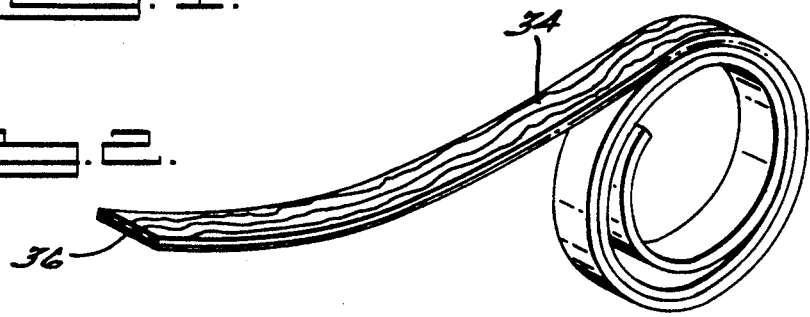
FIG. 2 is a perspective view of the wind reducing strip according the present invention.

Turning now to the drawings in particular to FIG. 1 thereof, an automotive vehicle 10 is illustrated as including a roof 12 on which is installed a luggage rack indicated generally at 14. The luggage rack 14 is illustrated as comprising a pair of transversely extending cross members 16, 18, the cross member 16 being positioned near the front 20 of the vehicle 10, and the cross member 18 being positioned near the rear 22 of the vehicle 10.

Figure 3:
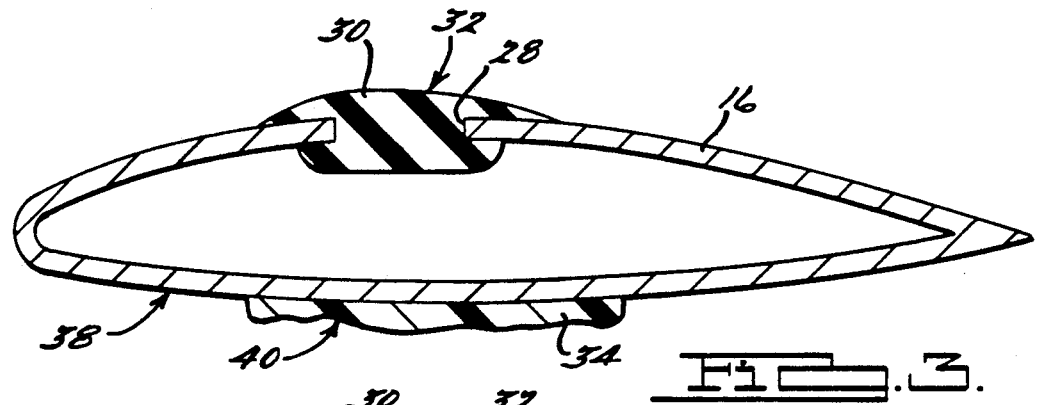
FIG. 3 is a cross sectional view taken along line 3—3 of FIG. 1.
Figure 4:
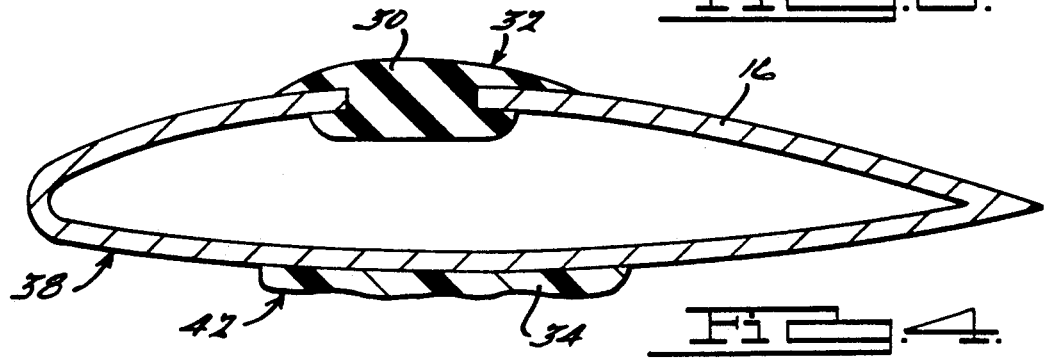
FIG. 4 is a cross sectional view taken along line 4—4 of FIG. 1.

Each of cross members 16, 18 is simply supported by a pair of known stanchions 24, 26 in spaced relationship with respect to the roof 12. The precise configuration of stanchions 24, 26 is not important to the present invention, but in the preferred embodiments they are operative to support and maintain the cross members 16, 18 in vertically spaced relationship with respect to the roof 12 and to present the cross member in its generally tear drop shaped configuration as shown in FIGS. 3 and 4 in facing relationship generally horizontally to the front of the vehicle 10. It is to be understood, however, that while the disclosed embodiment has a tear drop shaped cross sectional configuration that other shapes may be chosen within the teachings of the present invention.

According to the preferred embodiment, the cross members 16, 18 include apertures 28 for receiving in snap-fit relationship a rub strip 30, preferably formed from an elastomer in order to present a non abrading surface 32 facing upwardly to support articles to be carried by the luggage rack 14.

To reduce noise, induced by air flowing over the cross members 16, 18, there is provided a strip 34 which may be fabricated as a tape having an adhesive layer 36 secured to the underside 38 of at least the front cross member 16. The strip 34 is configured to present an irregularly shaped surface 40 to the air flowing underneath the cross member 16 and this irregular shape varies along the transverse axis of the cross member 16, as illustrated by the different surfaces 40, 42 shown in FIGS. 3 and 4. The degree of change that is necessary across the transverse extent of the cross member 16 may be established empirically when the natural frequency of the cross members 16, 18 are known. The strip 34 may be applied as by adhesively securing it to the surface 38 to ensure that the passage of air over the cross member 16, 18 does not excite that natural frequency. It is also possible to supplement or eliminate the noise reducing effect of the strip 34 by appropriately configuring the upper surface 32 of the rub strip 30 to modify the cyclical load input imposed by air flowing over the cross members 16, 18.

While only certain embodiments of the luggage racks of the present invention are shown or suggested here, others may occur to those skilled in the automotive aerodynamic arts without departing from the scope of the following claims. In particular, other cross sectional shapes such as elliptical, square or rectangular may be chosen for the cross members (16,18).

What is claimed is:

1. A luggage rack for an automobile body comprising:
   at least one transversely extending cross member,
   stanchion means for supporting opposed ends of each cross member to position the at least one cross member in generally parallel, spaced relationship with respect to the automobile body, and
   means defining a cross sectional shape of the at least one cross member that varies along the transverse extent of the at least one cross member.

2. A luggage rack as defined in claim 1, wherein the shape-defining means is also operative to define an external surface of the at least one cross member that is irregularly curved in the direction normal to the transverse extension of the at least one cross member.

3. A luggage rack as defined in claim 1, wherein the shape-defining means comprises an irregularly shaped elongated strip adhesively secured to the at least one cross member.

4. A luggage rack as defined in claim 2, wherein the shape-defining means comprises an irregularly shaped elongated strip, adhesively secured to the at least one cross-member.

5. A luggage rack as defined in claim 3, wherein the strip is fabricated as a tape.

6. A luggage rack as defined in claim 4, wherein the strip is fabricated as a tape.

7. A luggage rack as defined in claim 3, wherein the at least one cross-member is generally tear drop shaped in cross section.

8. A luggage rack as defined in claim 4, wherein the at least one cross member is generally tear drop shaped in cross section.

9. A luggage rack as defined in claim 6, and further comprising a second transversely extending cross member longitudinally spaced from the at least one transversely extending cross member.

10. A luggage rack as defined in claim 9, wherein the tape is applied to the surface of each of the cross members.

11. A luggage rack for an automobile body comprising:
    at least one transversely extending cross-member,
    stanchion means for supporting opposed ends of each cross member to position the at least one cross member in generally parallel, spaced relationship with respect to the automobile body, and
    means adhesively secured to the at least one cross-member for reducing wind noise.

12. A luggage rack as defined in claim 11, wherein the wind noise-reducing means comprises an irregularly shaped elongated strip adhesively secured to the at least one cross member.

13. A luggage rack as defined in claim 11, wherein the wind noise reducing means is formed as a tape.

14. A luggage rack for an automobile body, comprising at least one transversely extending cross member, having a tear drop shaped cross section,
    stanchion means for supporting opposed ends of each cross member to position the at least one cross member in generally parallel spaced relationship with respect to the automobile body, and
    means adhesively secured to the at least one cross member for reducing wind noise.

15. A luggage rack as defined in claim 14, wherein the wind noise-reducing means comprises an irregularly shaped elongated strip.

16. A luggage rack as defined in claim 14, wherein the wind noise-reducing means is adhesively secured to a generally horizontal surface of the at least one cross member facing the automobile body.

* * * * *